United States Patent
Geren et al.

(10) Patent No.: US 7,096,047 B2
(45) Date of Patent: Aug. 22, 2006

(54) ELECTRONIC AUDIO ACCESSORY FOR USE WITH AUTOMOTIVE STEREO LOUDSPEAKERS

(75) Inventors: Michael D. Geren, Suwanee, GA (US); Reed William Leonard, Lawrenceville, GA (US); Alay M. Mehta, Lawrenceville, GA (US)

(73) Assignee: Motorola, Inc., Schaumburg, IL (US)

( * ) Notice: Subject to any disclaimer, the term of this patent is extended or adjusted under 35 U.S.C. 154(b) by 855 days.

(21) Appl. No.: 09/998,103

(22) Filed: Nov. 30, 2001

(65) Prior Publication Data

US 2003/0104843 A1 Jun. 5, 2003

(51) Int. Cl.
*H04Q 7/20* (2006.01)

(52) U.S. Cl. ................................ 455/569.1; 455/569.2; 455/557

(58) Field of Classification Search ............. 455/569.1, 455/569.2, 563, 556.1, 557, 550.1, 575.9, 455/79, 575.6, 90.3, 194.1, 174.1; 439/188, 439/944
See application file for complete search history.

(56) References Cited

U.S. PATENT DOCUMENTS

| 5,243,640 A | 9/1993 | Hadley et al. |
| 5,867,794 A | 2/1999 | Hayes et al. |
| 6,052,603 A | 4/2000 | Kinzalow et al. |
| 6,058,319 A * | 5/2000 | Sadler ...................... 455/569.2 |
| 6,134,456 A | 10/2000 | Chen |
| 6,154,649 A | 11/2000 | Reichstein |
| 6,163,711 A | 12/2000 | Juntunen et al. |
| 6,173,195 B1 * | 1/2001 | Chen ........................ 455/569.2 |
| 6,301,491 B1 * | 10/2001 | Gong ........................ 455/569.1 |
| 6,304,764 B1 * | 10/2001 | Pan .......................... 455/569.2 |
| 6,397,086 B1 * | 5/2002 | Chen ........................ 455/569.2 |

FOREIGN PATENT DOCUMENTS

| EP | 0 659 029 B1 | 10/2000 |
| WO | WO 9828896 | 7/1998 |
| WO | WO 0014731 | 3/2000 |

* cited by examiner

*Primary Examiner*—Jean Gelin
(74) *Attorney, Agent, or Firm*—Philip H. Burrus, IV

(57) ABSTRACT

This invention offers an improved hands-free device for coupling to radio devices having mute and audio inputs. The invention couples serially between the radio and a portable electronic device such as a mobile telephone. The invention facilitates the delivery of appropriate audio signals to the radio. The invention also senses the activity of the portable electronic device and actuates a mute signal upon sensing such activity. The mute signal causes the radio to switch the input to its loudspeakers from a received signal to the audio being delivered by the invention from the portable electronic device. In so doing the invention offers an easy to install, inexpensive hands-free unit that takes advantage of the high fidelity loudspeakers in the automotive stereo system.

11 Claims, 4 Drawing Sheets

ELECTRONIC AUDIO ACCESSORY FOR USE WITH AUTOMOTIVE STEREO LOUDSPEAKERS

BACKGROUND

1. Technical Field

This invention relates generally to accessories for mobile telephones, and more specifically to an apparatus for interfacing a mobile telephone with an existing audio system for hands-free use of the mobile telephone.

2. Background Art

Many cities and municipalities have recently passed ordinances restricting the use of cellular telephones while driving. For example, §588.03 of Westchester County, N.Y. states, "No person shall utilize a cellular phone while operating a motor vehicle on any public street or public highway within the County of Westchester." Such laws generally include exceptions for cellular telephones equipped with "hands-free" devices. The Westchester code, for instance, states, "this law shall not be construed to prohibit a person operating a motor vehicle from utilizing a cellular phone equipped with a hands-free device." Simply put, a hands-free device is any device or technological advance that allows the user of a cellular phone to utilize the cellular phone without holding it in his or her hand.

In response, manufacturers of audio accessories have developed different types of hands free devices. One example, as advertised on late night television, is a unit that includes a self-contained speaker that is coupled to the earpiece of the phone. In other words, the phone is held in a clamp and a microphone is positioned over the earpiece. When audio is emitted from the earpiece, the microphone senses the audio, amplifies it, and couples it to a two-inch loudspeaker disposed in the hands-free unit. When the user talks, the system relies on the microphone in the phone to pick up the user's voice.

The problem with this type of solution is that the audio is typically of poor quality. To begin, the hands-free microphone coupled to the phone's earpiece picks up much background noise. When this is amplified, the audio produced by the self-contained speaker is often distorted. Next, as the microphone in the cellular phone is designed for near-field use, it sometimes will not pick up the user's voice where the user is far away. Consequently, the transmitted audio from the cellular phone to the receiving caller can be very poor.

As most cars are equipped with high fidelity stereo systems, other manufacturers have found creative ways to employ the stereo loudspeakers in hands-free devices. For example, U.S. Pat. No. 6,163,711, issued to Juntunen et al., discloses a method of coupling a hands-free device to a stereo by modulating the telephone audio with AM or FM radio signals. When the hands-free device is coupled to the phone, the hands-free receives the audio signal and converts it to a FM signal that is, in turn, broadcast in the near field of the car stereo. The user simply turns to the preset "hands-free station" to hear the phone audio on the stereo loudspeakers.

The problem with this approach is two-fold: First, the FM signal broadcast by the hands-free unit is not localized to the car. Thus, if someone stops adjacent to the user at a red light, the other person may eavesdrop on the user's call by simply tuning to the proper radio station. Second, the user must physically tune the radio anytime a call is received. As anyone with an analog-tuning radio knows, this can be both time consuming and distracting.

A third approach is to couple the hands-free device between the stereo and the loudspeakers, as disclosed in U.S. Pat. No. 6,134,456 issued to Chen. In this system, a device is coupled between the stereo and the speakers. When a call is received, the device breaks the connection from the radio and makes a connection to the phone. The audio from the phone is then broadcast through the loudspeakers.

The problem with this system is that it is difficult to install. It requires that the power-carrying loudspeaker cable be severed and then reattached through the device. As loudspeaker wires often run through the sides and undercarriage of the car, this sometimes requires cutting of metal and plastic to reach the wires. The installation is almost always done professionally and is quite expensive.

There is thus a need for an improved hands-free device for cellular phones.

DETAILED DESCRIPTION OF THE INVENTION

Figure 1:
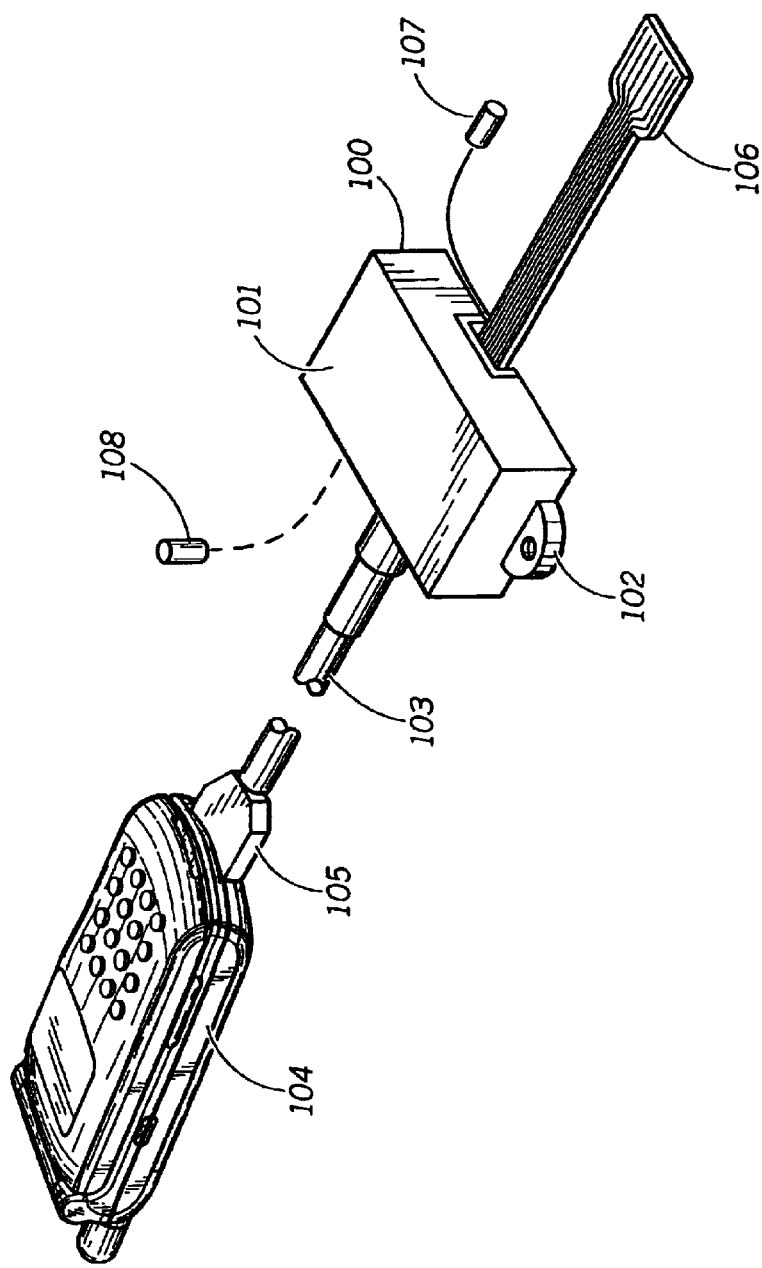
FIG. 1 is one preferred embodiment of a hands-free device in accordance with the invention coupled to a mobile telephone.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

This invention takes advantage of special connections on the back plate of commercial automotive radios to provide a low-cost, easy to install, high fidelity hands-free system. Specifically, radios such as the DEH-P7300 manufactured by Pioneer, the DF941 manufactured by Delphi, and the PU2354A-Z manufactured by Clarion each provide specific input connectors on the back plate of the radio for mute and audio functionality. This invention provides a means for interfacing a mobile telephone to such a radio.

Referring now to FIG. 1, illustrated therein is one preferred embodiment of a hands-free device 100 in accordance with the invention. The device 100 includes a housing 101 having optional fastener apertures 102 for mounting in a vehicle. The housing 101 is preferably made of plastic, polycarbonate or other durable equivalents via an injection molding process.

The device 100 includes a cable 103 for coupling to a mobile telephone 104. The cable 103 has a plurality of conductors disposed within. The plurality of conductors may carry both power and data signals to and from the telephone 104. These signals include power for charging a rechargeable battery and for powering the phone, audio and digital data, control signals, and return paths. The cable 103 includes a phone specific connector 105 suited for the particular telephone 104.

The device 100 includes a power connector 106 for coupling power to the device 100. The power connector 106 may take any number of forms, including permanent connection to the automotive power system, a cigarette lighter adaptor for coupling to a power jack, or other equivalents.

The device 100 further includes a connector 107 for coupling to the radio back plane. As stated above, the connector 107 comprises at least two signals: mute and audio in. When the mute line is actuated, the radio responds by changing the input to its loudspeakers from a received radio broadcast to whatever signal is present at the audio in terminal. The result is that the audio from the current input, e.g. radio station, tape, compact disc, auxiliary input, etc., is cut off, and the signal coupled on the audio in line is broadcast on the loudspeakers. The coupling at audio in, which is supplied by connector 107, is sent through the radio's amplification circuitry to the loudspeakers in the car. This connector 107 offers advantages over the prior art in that it is easy to install and does not require the user to sever loudspeaker cables. Additionally, this invention utilizes the radio power amplifiers. This means that the invention operates with low power. The prior art that couples between the radio and speakers requires high power to drive the speakers.

The device 100 also includes a microphone. As stated above, mobile phone microphones are designed to operate in the near field only. To improve audio quality, one preferred embodiment of the invention includes a separate microphone designed to work in a hands-free environment. The microphone 108 may include appropriate filtering to help reduce background noise. The microphone 108 is shown here with a dashed line because the microphone may be external to the device 100 or integrated into the device 100. The former is preferable where the user wants to mount the device 100 out of sight, while the latter is preferable if the device 100 within an audible distance.

Figure 2:
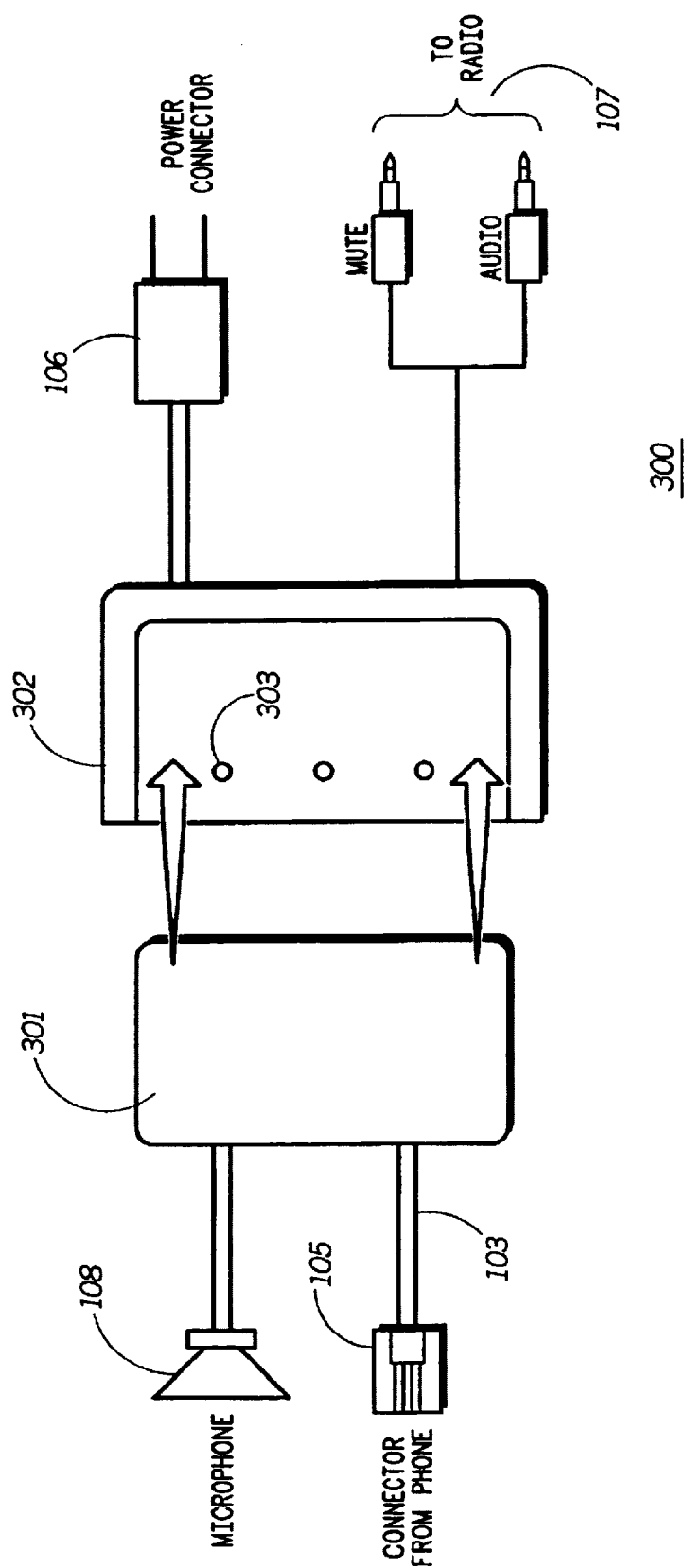
FIG. 2 is a block diagram of a second preferred embodiment of a hands-free device in accordance with the invention.

Referring now to FIG. 2, illustrated therein is another preferred embodiment 300 of the invention. This embodiment includes the connectors of FIG. 1, namely the power connector 106, the phone specific connector 105 on the phone cable 103, the optionally external microphone 108 and the connector for the radio back plate 107. The main difference is that the housing is now two pieces: a phone specific device 301 and a receiving device 302.

The phone specific device 301 has circuitry designed to accommodate a particular model phone. The receiving device 302 is designed to receive any of a number of phone specific devices. The receiving device 302 includes electrical contacts 303 for mating electrically to the phone specific device 301. The phone specific device 301 includes complimentary electrical contacts (not shown). The advantage of this embodiment 300 is that a user may switch between phones by changing only the phone specific device 301. The user need only buy one receiving device 302. This configuration reduces both cost and installation time.

Figure 3A:
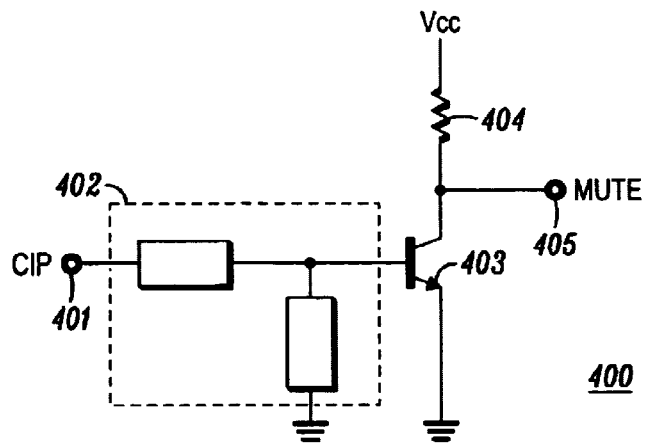
FIGS. 3(a)–3(c) are exemplary schematic diagrams in accordance with the invention.
Figure 3B:
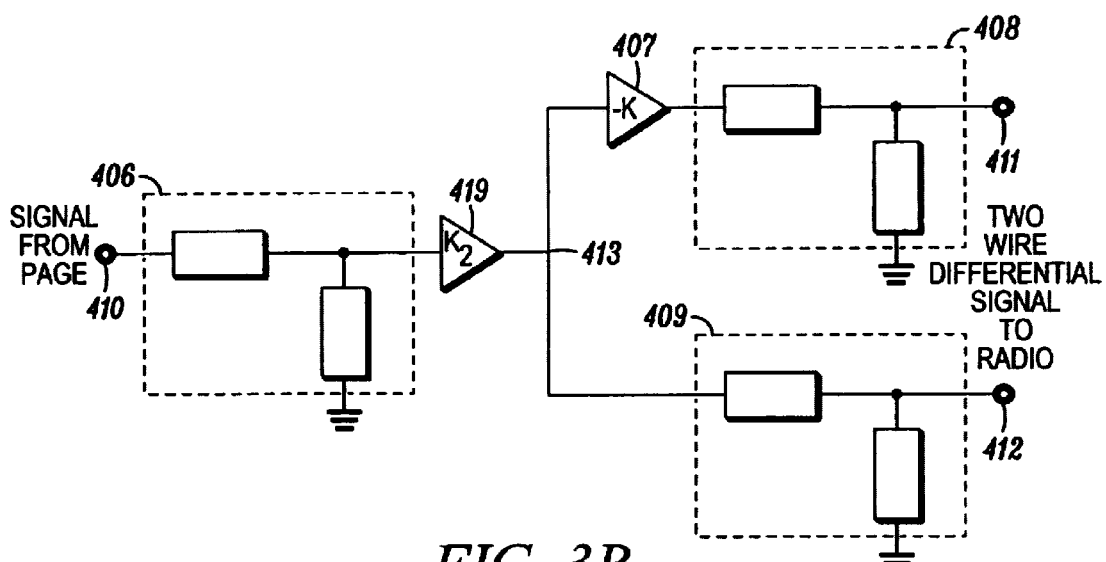
Figure 3C:
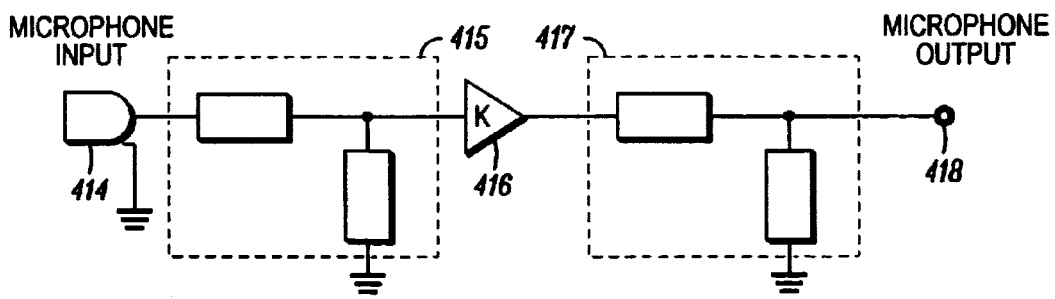

Referring now to FIGS. 3(a) through 3(c), illustrated therein are some exemplary circuits for use in the present invention. It is well to note that the invention is suited for housing any number of electronic circuits, including charging circuits, data processing circuits, microprocessors, digital signal processors, power regulators, programmable logic, and the like. One basic embodiment includes circuits for actuating the mute function of the radio, amplifying the audio and processing the microphone signal.

Referring to FIG. 3(a), illustrated therein is a basic circuit 400 for actuating the mute function. Some phones include "call in progress", or "CIP", lines that toggle whenever a call is in progress. These phones require only the basic circuit 400 with the CIP signal coupled thereto to actuate the line appropriately for the radio back plane. Other phones do not include such circuitry. These phones may require data detection circuits like that disclosed in commonly assigned U.S. patent application Ser. No. 09/676,344, filed Sep. 29, 2000, to be coupled serially between the data lines and the basic circuit 400. U.S. patent application Ser. No. 09/676,344, filed Sep. 29, 2000, is incorporated herein for all purposes.

The basic circuit 400 is straightforward in its operation. Either the CIP signal or data detection circuit is coupled to the CIP input 401. This signal may be coupled serially through optional filtering circuitry 402, comprising inductors, capacitors and resistors, to prevent nuisance tripping. From the optional filtering circuitry the signal is coupled to a switch 403, illustrated herein as a bipolar junction transistor (BJT). The switch performs an amplifying function as it switches a pull-up resistor 404 to ground, thereby providing a hard, full-rail switching signal to the mute connector 405.

Referring to FIG. 3(b), illustrated therein is a basic differential amplification circuit for processing the audio data coupled from the phone. The audio data from the phone is coupled to the input signal connector 410. From there, optional filtering 406 may be added to improve the signal to noise ratio. A gain stage 419 is added to amplify the signal from the phone. It is advantageous to amplify the signal here, rather than in the phone, because the automotive power supply may be employed, thereby extending the phone's battery life.

The signal is then divided at node 413 with the signal being delivered through an optional filter 409 to connector 412. The signal is also inverted through an amplifier 407 having a gain of preferably −1, and passed through optional filtering 408 to connector 411. Connectors 411 and 412 provide a differential signal to the radio capable of sourcing and sinking current to and from a load.

Referring to FIG. 3(c), illustrated therein is an exemplary microphone circuit. The circuit includes a microphone 414 capable of generating an electromagnetic wave in response to incident audio waves. The microphone is coupled to an amplification stage 416 through optional filtering circuitry 415. The amplified signal is then coupled to a microphone output connector 418 through an additional optional post-gain filter 417 that further improves the signal to noise ratio. The output connector 418 is coupled to the phone as audio in.

Figure 4:
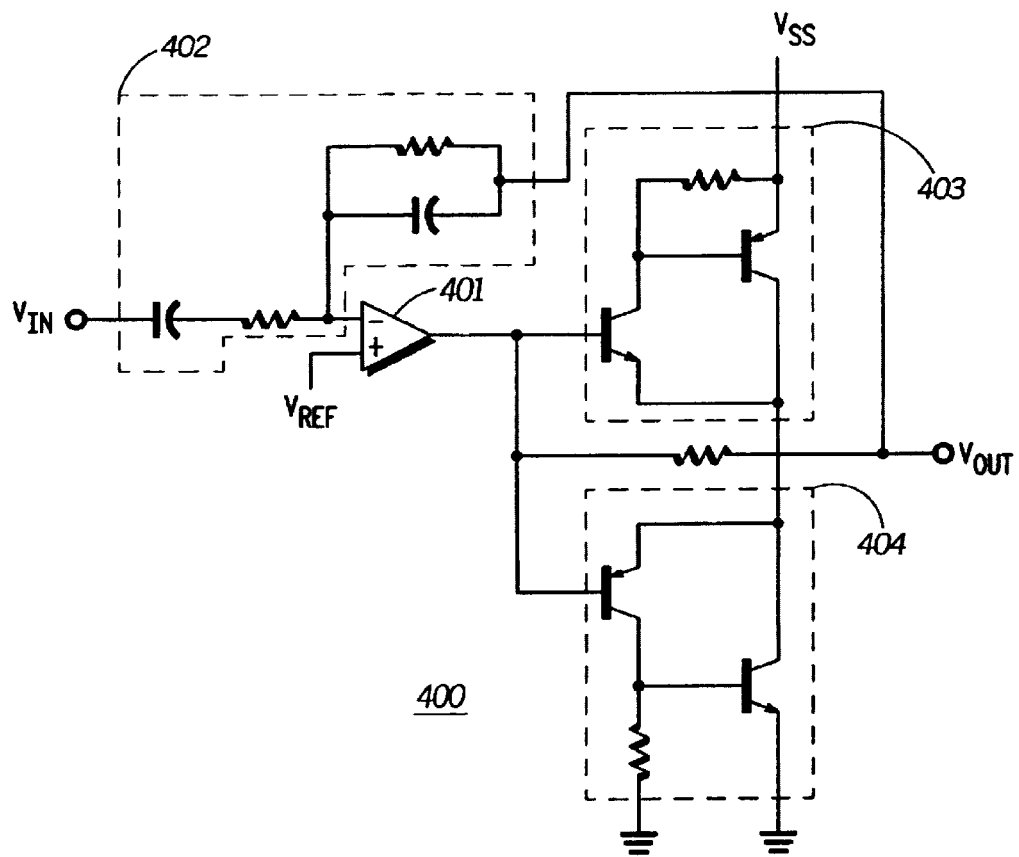
FIG. 4 illustrates an examples of an amplifying gain stage circuit, which corresponds to the gain stage of FIG. 3B.

Referring now to FIG. 4, illustrated therein is one example of an amplifying gain stage circuit 400, which corresponds to element 419 in FIG. 3(b). The circuit 400 comprises an operational amplifier (op-amp) 401 with corresponding frequency shaping and feedback components 402. The op-amp stage 401,402 is followed by two pairs of power transistors 403,404 coupled in a push-pull configuration. The power transistors 403,404 are capable of sourcing and sinking large amounts of current in response to the op-amp 401 to drive a load.

The invention thus provides a means of receiving, processing, transmitting and coupling signals between a mobile phone and a radio having back plate inputs for muting a radio and receiving audio. The invention provides audio with sufficient bandwidth to take advantage of the stereo loudspeakers in an automobile to provide a high fidelity hands free device. The invention facilitates switching between the radio and the mobile phone without the need of manually tuning the radio. The two-piece embodiment allows simple swapping for accommodation of multiple phones.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while a preferred embodiment has been illustrated as working with mobile phones, the invention could easily be adapted to accommodate personal data assistants, computers, MP3 players, compact disc players and the like.

What is claimed is:

1. A hands-free device for a portable electronic device, the device comprising:
   a. a housing for accommodating electrical circuitry;
   b. a cable for coupling to a portable electronic device, the cable comprising a device specific connector;
   c. a power connector for coupling power to the device; and
   d. a connector for coupling to a radio back plate, wherein the connector for coupling to the radio back plate comprises at least a mute signal and an audio signal;
   wherein the mute signal is actuated when data is transmitted from the device to the radio back plate.

2. The device of claim 1, further comprising a microphone and electrical circuitry for processing signals from the microphone.

3. The device of claim 2, wherein the electrical circuitry comprises:
   a. an audio amplification circuit for amplifying the audio signal; and
   b. a switching circuit for actuating the mute signal.

4. The device of claim 3, wherein the portable electronic unit comprises a mobile telephone.

5. A hands free device for a portable electronic device, the device comprising:
   a. a housing for accommodating electrical circuitry;
   b. a cable for coupling to a portable electronic device, the cable comprising a device specific connector;
   c. a power connector for coupling power to the device; and
   d. a connector for coupling to a radio back plate, wherein the connector for coupling to the radio back plate comprises at least a mute signal and an audio signal;
   wherein the mute signal is actuated when data is transmitted from the device to the radio back plate, and
   wherein the housing comprises a first part and a second part, wherein the first part has a first mating means for mechanically coupling to the second part, and the second part has a corresponding mating means for coupling to the first part.

6. The device of claim 5, wherein the first part further comprises a first set of electrical connectors and the second part comprises a corresponding set of electrical connectors.

7. The device of claim 6, wherein the first part is capable of mechanically and electrically coupling to the second part.

8. The device of claim 7, wherein the portable electronic unit is selected from the group consisting of mobile telephones, personal data assistants, computers, compact disc players and MP3 players.

9. A system for providing high fidelity hands free operation for a portable electronic unit, the system comprising:
   a. a radio having a mute input and an audio in input, wherein when the mute input is actuated the radio switches the signal coupled to at least one loudspeaker from radio reception to the audio in input;
   b. a portable electronic unit baying at least an audio output; and
   c. an interface device having:
      i. means for connecting the device to the portable electronic unit;
      ii. means for coupling the device to the mute input;
      iii. means for coupling the device to the audio in input of the radio; and
      iv. means for detecting activity of the portable electronic unit and actuating the means for coupling the device to the mute input upon detection of the activity.

10. The device of claim 9, wherein the interface device further comprises a microphone and microphone amplification circuitry.

11. The device of claim 10, wherein the portable electronic unit comprises a mobile telephone.

* * * * *